United States Patent Office 3,319,927
Patented May 16, 1967

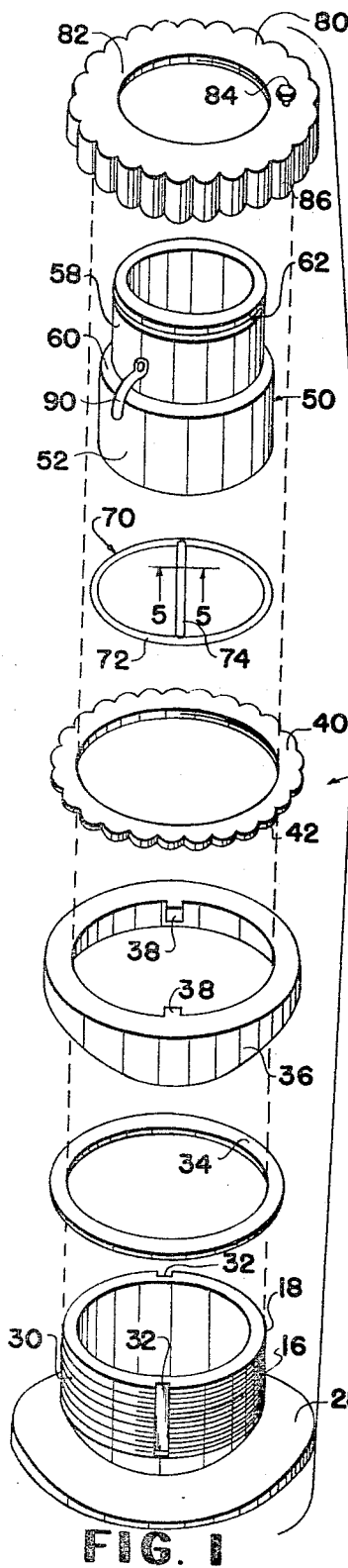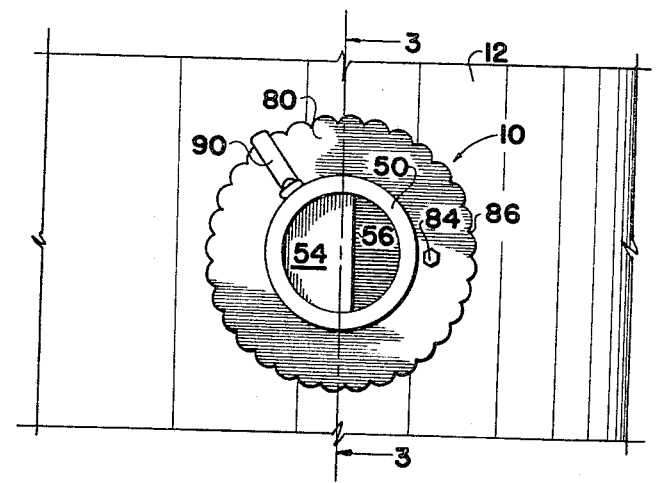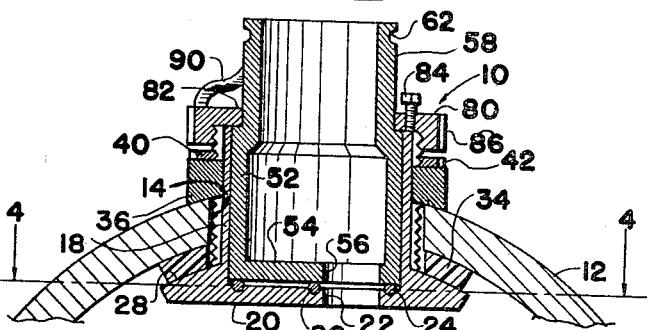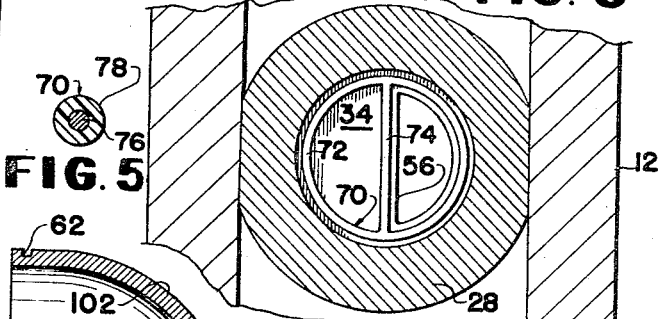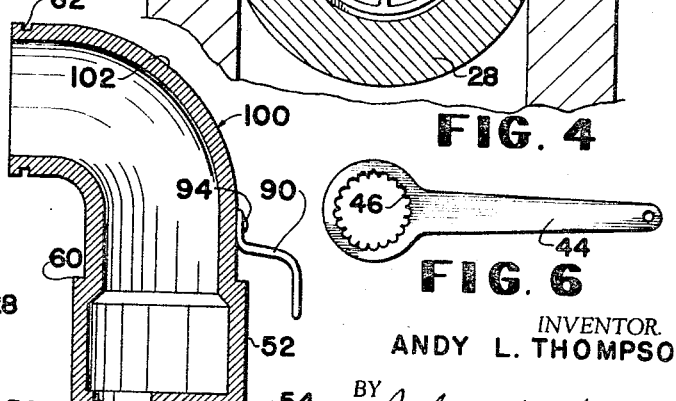

3,319,927
IRRIGATION PIPE VALVE
Andy L. Thompson, R.R. 2, Courtland, Kans. 66939
Filed June 8, 1964, Ser. No. 373,250
6 Claims. (Cl. 251—145)

This invention relates to valves, more particularly to outlet valves for above the ground irrigation pipes. More specifically this invention relates to an irrigation pipe valve having a body portion adapted to be secured to an irrigation pipe or the like, a means to secure the valve body to the pipe, and a valve core having an opening which is selectively alignable with an opening in the valve body.

There are many types of irrigation valves known to the prior art. However, the irrigation valves known to the art have a number of serious shortcomings. Many of these valves are subject to clogging by sand, silt, and other assorted debris commonly encountered in water used to irrigate. This clogging presents troublesome maintenance and surveillance problems. Another serious short coming of many of the valves known to the prior art is that they cannot be readily disassembled for minor repair and preventative maintenance in the field without removing the base portion connected to the irrigation pipe. In changing seals, cleaning, etc., it is desirable to be able to leave the base portion connected to the pipe while removing the valve core, or other movable element, from the outside. In prior art irrigation valves many are so designed and constructed that minor maintenance and cleaning become a major time consuming operation necessitating elaborate tools, etc. Still another shortcoming of irrigation valves known to the prior art is that many do not provide an effective seal between the base valve element mounted on the irrigation pipe and the valve core. Since irrigation water contains much silt, and sand, normal rotation of the valve core may produce a great deal of wear and/or material may be wedged between the base and the core causing a leak. Further many of these valves known to the prior art have coarse threads between the valve body and valve core which are used to provide relative displacement therebetween. Water will often leak through these threads when the valve is open thereby causing large muddy areas adjacent the pipe. Still another short coming of the valves known to the prior art is that often there is no visible indicator of the valve setting. When there is no pressure in the irrigation pipe, it may be difficult or time consuming to determine whether or not the valve is in on or off position. Many of the valves known to the prior art do not provide a positive setting for maintaining a stable valve setting. As water rushes through the valve, vibrations are often set up which could change the setting, either opening it too far or closing it entirely. Another disadvantage of the valves known to the prior art is that in practice valves must be positioned on both sides of the pipe in order to supply water to areas on both sides. This arrangement necessitates a large number of valves and which entails a larger investment and more maintenance.

I have invented a new valve. The new valve of my invention has a hollow body having an opening therein. The body has means to secure same to another member. A movable core is disposed in the hollow body, which core has an opening adapted to be selectively aligned and misaligned with the opening in the body. A resilient seal means is disposed between the body and the core and surrounding one of the openings. The resilient seal means seals the joint between the body and the core.

The new valve means of my invention solves all of the problems associated with valves, more particularly irrigation gate valves, known to the prior art. My new valve will not readily clog, or become obstructed with sand, silt, etc., often present in water used to irrigate. The valve of my invention can be disassembled in the field, that is without removing the base from the pipe, for repair, cleaning, and normal maintenance. This feature is very important when it becomes necessary to change the seal means. Inasmuch as the water used to irrigate often contains sand, silt, etc., it may be necessary to occasionally change the seal. Another important advantage of my valve means is that there is no leak between the base valve element and the core when the valve is open. As previously mentioned prior art valves often utilize coarse threads between the valve base and the core to provide relative movement. Water has a tendency to leak through the coarse threads when the gate valves known to the prior art are open. Another important feature of my invention is that a means is provided for positively maintaining the setting of the valve core. The valve core will not alter its position relative to the valve base to thereby open or close or otherwise change the desired setting in normal use. A means provides a visual setting indicator on my valve. Further, in the specific embodiment of my valve, the adjustment nuts provided have scalloped peripheral edges that make them stronger than conventional nuts. This feature enables my valve to withstand rough handling, etc., and/or makes it possible to make the elements lighter in weight thereby saving material and making same easier to handle. A specific embodiment of my invention includes an elbow mounted on the rotatable valve core. With this arrangement the same valve can be mounted on the top of irrigation pipe and used to supply water to areas on both sides thereof. When the elbow is turned in one direction, that side can be irrigated. Alternately, when the elbow is turned to the opposite side that particular side can be irrigated. The elbow also serves as a convenient indicator to indicate the position of the valve core. This specific embodiment of my valve enables a single valve to replace two valves normally positioned on both sides of the pipe when areas on both sides of the pipe are desired to be irrigated.

An object of this invention is to provide a new valve means.

Another object of this invention is to provide a new valve means particularly suited for irrigation purposes.

Still another object of this invention is to provide an irrigation gate valve that will not clog or become obstructed.

Another object of this invention is to provide an irrigation gate valve that can be disassembled in the field without removing the valve base from the pipe.

Another object of this invention is to provide an irrigation gate valve that has a means for positively retaining the setting for the valve opening.

Still another object of this invention is to provide an irrigation gate valve that is simple to install, assemble, and maintain, and is dependable in operation.

Another object of this invention is to provide an irrigation gate valve having a means to indicate the valve setting.

Still another object of this invention is to provide an irrigation gate valve that is adapted to be installed on the top of an irrigation pipe and utilized to irrigate areas on both sides of the pipe.

Another object of this invention is to provide an irrigation gate valve that does not leak irrespective of whether or not the valve is opened or closed.

Other objects and advantages of the new valve means of my invention will become apparent to those skilled in the art upon reading the disclosure.

Drawings accompany and are a part of this disclosure. These drawings depict preferred specific embodiments of the new valve means of my invention and it is to be understood that such drawings are not to unduly limit the scope of my invention. In the drawings, FIG. 1 is a perspective view in exploded relationship of a specific embodiment of the new irrigation valve of my invention.

FIG. 2 is a top view of a preferred specific embodiment of my valve means installed in a length of irrigation pipe.

FIG. 3 is a cross sectional view in broken setcion taken on line 3—3 of FIG. 2.

FIG. 4 is a cross sectional view taken on line 4—4 of FIG. 3.

FIG. 5 is a cross sectional view taken on line 5—5 of FIG. 1.

FIG. 6 is a top view of a specific embodiment of a wrench used to assemble and disassemble a preferred embodiment of my gate valve.

FIG. 7 is a cross sectional view of another preferred specific embodiment of a valve core of my invention.

The following is a discussion and description of the new irrigation gate valve of my invention made with reference to the drawings, whereon the same reference numerals are used to indicate the same or similar parts and/or structure. The discussion and description is of preferred specific embodiments of the new irrigation gate valve of my invention, and it is to be understood to not unduly limit the scope of my invention.

Referring now to the drawings, FIGS. 1–7, there is illustrated in FIGS. 1 through 5 a preferred specific embodiment of my irrigation gate valve 10 and elements thereof. In FIGS. 2–4 the irrigation valve 10 is shown installed in a length of irrigation pipe 12 having an opening 14. The irrigation valve 10 has a valve body 16 having a cylindrically shaped portion 18. A flat wall 20 having a D-shaped opening 22 is provided on one end of cylindrically shaped body portion 18. In the top surface of wall 20, inside of the valve body 16, there is provided an annular shaped depression 24. A central elongated diametrically disposed depression 26 is also provided on the inside surface of the wall 20 and is connected to the annular depression 24 at each end thereof. The reason for the depressions 24 and 26 will become apparent later in the disclosure. An outwardly extending semi-cylindrical curvated flange 28, adapted to conform to the inside surface of irrigation pipe 12, is provided on one end of valve body 16. Thread means 30 are provided on the outside surface of the cylindrically-shaped body portion 18 of valve body 16. Diametrically disposed longitudinally extending slots 32 are also provided on valve body portion 16 which terminate short of flange 28 as illustrated in FIG. 1. Valve body 16 can be made of any suitable type of material such as plastic, metal, ceramics, etc. Preferably the valve body 16 is made of metal, more preferably of a metal which is resistant to corrosion and the like such as brass. An annular shaped resilient seal 34 having an inside diameter slightly greater than the outside diameter of the valve body 16 is positioned over the cylindrically-shaped portion 18 and in use is in engagement with the curvated flange 28 and the inside surface of irrigation pipe 12. This relationship is clearly illustrated in FIG. 3 of the drawings. The seal 34 is adapterd in use to seal the joint between the valve body 16 and the irrigation pipe receiving the body. The seal can be made of any suitable material, preferably rubber. A saddle washer 36 is disposed about the cylindrically-shaped portion 18 of valve body 16 and is adapted in use to conform to the exterior surface of the irrigation pipe 12. Diametrically opposed inwardly extending lugs 38 are provided which in use are disposed in slots 32 of the valve body. The lugs 38, disposed in slots 32, positively maintain the alignment between the valve body and the saddle washer 36. A nut 40 is disposed about the valve body 16 in operative engagement with the thread means 30. The nut is provided with the scalloped peripheral surface 42. It has been found that this type of peripheral scalloped surface makes it possible to reduce the radial dimension of the nut 40. In use the nut 40 is adjusted with wrench 44 which has a complementary scalloped surface 46 adapted to engage the surface 42 on nut 40. The wrench 44 is illustrated in FIG. 6 of the drawings. A hollow valve core 50 is rotatably disposed in valve body or base 16. The core 50 has a first cylindrically-shaped portion 52 received in the cylindrically shaped body portion 18 of valve body 16. This relationship is clearly shown in FIG. 3 of the drawings. A flat end wall 54 having a D-shaped opening 56 is provided on the cylindrically-shaped body portion 52 of core 50. The D-shaped opening 56 is adapted to be aligned with the D-shaped opening 22 in valve body portion 16. Any suitable shaped opening can be provided in valve body 16 and core 50. A second cylindrically shaped portion 58 having a reduced outside diameter is joined to the first portion 52. An exterior annular abutment surface 60 is provided at the juncture of the first and second portions 52 and 58. An exterior peripheral retainer groove 62 is provided adjacent the top end of cylindrical portion 58. This retainer groove makes it possible to secure an irrigation hose, conduit, or the like to the valve. The irrigation conduit can be secured to the cylindrical portion 58 by a snap ring, or other suitable fastening means, which is old in the art.

As more clearly shown in FIGS. 3 and 4 an O-ring type seal 70 is positioned between the end wall 20 of the valve body and the end wall 54 of the valve core 50. The O-ring seal 70 has an annular portion 72 and a chord portion 74. The annular portion is seated in the annular depression 24 and the chord portion 74 of the seal is seated in the depression 26. Preferably the O-ring type seal 70 has a solid metal core 76, shown in FIG. 5, with a resilient covering 78 surrounding same. The metal core 76 is desirable since it will serve to maintain the chord portion 74 of the seal 70 in the depression 26 as the valve core 50 is rotated. It can be seen that as valve core 50 is rotated the chord portion 74 of the seal will extend across the D-shaped opening. A valve core adjustment nut 80 is disposed about valve body 16 in threaded engagement with the thread means 30. Adjustment nut 80 has an annular inwardly extending flange 82 in engagement with the abutment surface 60 of valve core 50. A longitudinally extending threaded aperture is provided in flange 82 of the adjustment nut 80. A bolt means 84 is disposed in the threaded aperture and adapted in use to lock the nut 80 relative to the body 16. As illustrated in FIG. 3 when the bolt 84 is turned downwardly it engages the top surface of cylindrical portion 18 of valve body 16. The adjustment nut 80 is also preferably provided with a scalloped peripheral surface 86 similar in shape and size to the scalloped surface 42 on nut 40. This surface can be used with the wrench 44 in the same manner as described in connection with nut 40. A curved spring detent means 90 is also provided. The detent means 90 has one end 92 suitably secured to the valve core 50 with a bolt 94 or other suitable means. The other end of detent means 90 is disposed in engagement with the scalloped surface 86 of the valve core adjustment 80. The detent means assures the maintenance of the setting of the valve core with respect to the valve body 16. The outlet valve 10 of the invention is adapted in use to be opened by rotating the valve core 50 to align the D-shaped openings in the core and valve body, and closed by rotating the core to misalign the openings.

In FIG. 7 is illustrated still another specific embodiment of my invention of a valve core 100 adapted to be positioned in the valve body 16. The valve core 100 is generally similar to the valve core 50 since it has a first cylindrical portion 52 with an end wall 54 having an opening 56, an abutment surface 60 and a spring detent 90. However, valve core 100 is provided with an elbow shaped portion 102 which protrudes well above the valve body 16. In use the valve core 100 can be turned either to the left or to the right when the valve of my invention is disposed in the top of an irrigation pipe. With this embodiment of my invention the area to both sides of an irrigation pipe can be irrigated with a single valve.

As will be obvious to those skilled in the art, various changes and modifications of the preferred valve of my invention can be made or followed without departing from the spirit of the disclosure or the scope of the claims.

I claim:

1. An outlet valve for installation in a circular opening in an above-ground irrigation pipe comprising, a valve body having a cylindrical shape, a flat wall on a first end of said body having a D-shaped opening therein, an annular shaped depression in the inside surface of said wall, a central elongated diametrically disposed depression on the inside surface of said wall connected to said annular depression, an outwardly extending semicylindrically curved flange on said first end of said body adapted to conform to the inside surface of an irrigation pipe, thread means on the outside surface of said valve body, diametrically opposed longitudinally extending slots in the outside surface of said valve body, an annular shaped resilient seal having an inside diameter slightly greater than the outside diameter of said valve body positioned over same and in engagement with said curved flange and adapted in use to seal the jointure between said valve body and opening in an irrigation pipe receiving said body, a saddle washer disposed about said body having a semi-cylindrically curved surface adapted in use to conform to the exterior of an irrigation pipe, diametrically opposed inwardly extending lugs on said washer disposed in said slots in said body, a nut disposed about said body in operative engagement with said thread means, a scalloped peripheral surface on said nut, a hollow valve core rotatably disposed in said valve body, said core having a first cylindrically shaped portion, a flat end wall on said first portion having a D-shaped opening therein adapted to be aligned with said opening in said body, a second cylindrically shaped portion having a reduced outside diameter joined to said first portion, an exterior annular abutment surface at the jointure of said first and second portions, and an exterior peripheral retainer groove adjacent the end of said second portion, an O-ring type seal having a chord portion seated in said annular and central depressions in said wall of said body in sealing engagement with said body wall and said wall of said core, a metal core in said O-ring, a valve core adjustment nut disposed about said body in threaded engagement with said thread means, an annular inwardly extending flange on said adjustment nut in engagement with said abutment surface on said valve core, a longitudinally extending threaded aperture in said flange on said adjustment nut, a bolt means disposed in said threaded aperture adapted in use to lock said nut, relative to said body, a scalloped peripheral surface on said adjustment nut, a curved spring detent means having one end thereof secured to said second portion of said valve core, and the other end disposed in engagement with said scalloped surface of said valve core adjustment nut, said outlet valve adapted in use to be opened by rotating the valve core to align the D-shaped openings in the core and valve body, and closed by rotating the core to misalign the openings.

2. An outlet valve for installation in an opening in an irrigation pipe comprising, a valve body having a cylindrical shape and a flat end wall having an opening therein, an annular depression in the inside surface of said wall, a diametrically disposed depression connected to said annular depression, an outwardly extending semi-cylindrically curved flange on said valve body adapted to conform to the inside surface of an irrigation pipe, thread means on the outside surface of said valve body, longitudinally extending slots on the outside surface of said body, an annular resilient seal disposed about said valve body and in engagement with said curved flange and adapted in use to seal the jointure between said valve body and an irrigation pipe receiving said body, a saddle washer disposed about said body having a semi-cylindrical surface adapted in use to conform to the exteior of an irrigation pipe, inwardly extending lugs on said washer disposed in said slots on said valve body, a nut disposed about said valve body in operative engagement with said thread means, a hollow valve core rotatably disposed in said valve body, said core having a first cylindrically shaped portion with a flat end wall having an opening therein adapted to be aligned with the opening in said valve body, a second cylindrically shaped portion having a reduced outside diameter joined to said first cylindrically-shaped portion, an exterior annular abutment surface at the jointure of said first and second cylindrically shaped portions, an O-ring type seal having a connecting chord portion seated in said annular and connecting depressions in said wall of said body in sealing engagement with said body wall and said wall of said core, a valve core adjustment nut disposed about said body in engagement with said thread means, an inwardly extending abutment means in engagement with said abutment surface of said core, a means to lock said adjustment nut relative to said valve body, and a means to restrain movement of said core relative to said valve body, said valve adapted in use to be opened by rotating the valve core to align the openings in the core and valve body and closed by rotating said core to misalign the openings.

3. A valve for installation in an irrigation pipe comprising, a valve body having a cylindrical shape and a flat end wall having an opening therein, an outwardly extending semi-cylindrically curved flange on one end of said valve body adapted to conform to the inside surface of an irrigation pipe, thread means on the outside surface of said valve body, a saddle washer disposed about said valve body having a semi-cylindrically curved surface adapted in use to conform to the exterior of an irrigation pipe, an annular resilient seal means adapted to be positioned between said flange of said valve body and an irrigation pipe, a nut disposed about said body in operative engagement with said thread means, a hollow valve core rotatably disposed in said valve body having an end wall having an opening therein adapted to be aligned with said opening in said body, an abutment means on the exterior surface of said valve core, a valve core adjustment nut disposed about said body in threaded engagement with said thread means and having an annular inward extending flange in engagement with said abutment means on said core, a means to lock said adjustment nut relative to said valve body, an O-ring type seal disposed between the end walls of said valve body and said valve core and encircling said opening therein, means to secure said O-ring type seal in said position relative to said valve body, said valve adapted in use to be opened by rotating the valve core to align the openings in the core and valve body and alternately to close same by rotating the core to misalign the openings.

4. The valve of claim 3, wherein said valve core is provided with an elbow shaped end portion opposite said end wall.

5. A valve for installation in an irrigation pipe comprising, a valve body having a circular cross section and an end wall having an opening therein, an outwardly extending semi-cylindrically curved flange on said body adapted to conform to the inside surface of an irrigation pipe, thread means on the outside surface of said valve body, resilient seal means disposable between said curved flange and the inside surface of an irrigation pipe, a washer means disposed about said valve body, a nut disposed about said valve body in operative engagement with said thread means, a hollow valve core rotatably disposed in said valve body having an end wall having an opening therein selectively alignable with said opening in said valve body, outlet means on said valve core, abutment means on said valve core, a valve core adjustment nut disposed about said valve body in engagement with said thread means, a seal disposed between said end wall of said body and said end wall of said valve core and encircling an opening, a means to lock said valve adjustment nut relative to said valve body, said outlet valve adapted in use to be opened and closed by rotating the valve core to align and misalign said openings in said core and said valve body.

6. A valve comprising, a valve body having a circular cross section and an end wall having an opening therein, a flange on said body adapted to conform to the inside surface of a pipe, tank, or the like, connecting means on the outside of said valve body, means engageable with said valve body and flange and said connecting means thereon and a pipe, tank, or the like, when said valve body is mounted in same to sealingly secure said valve body therein, a hollow valve core turnably disposed in said valve body having an end wall having an opening therein selectively alignable with said opening in said valve body, outlet means on said valve core, engagement means on said valve core, valve core adjustment means disposed on said valve body in engagement with said connecting means on the outside of said valve body, sealing means disposed between said valve body and said valve core and surrounding an opening, means to keep said valve adjustment means in desired position relative to said valve body, said valve adapted in use to be opened and closed by turning said valve core to align and misalign said openings in said core and said valve body.

References Cited by the Examiner
UNITED STATES PATENTS

| | | | |
|---|---|---|---|
| 1,344,383 | 6/1920 | Conran | 251—352 |
| 2,304,303 | 12/1942 | Ferguson | 251—352 |
| 2,901,211 | 8/1959 | Epp | 251—145 |
| 3,033,514 | 5/1962 | Grosch | 251—145 |

M. CARY NELSON, *Primary Examiner.*

W. R. CLINE, *Assistant Examiner.*